United States Patent [19]

Moore et al.

[11] Patent Number: 4,573,806
[45] Date of Patent: Mar. 4, 1986

[54] THERMOCOUPLE ISOLATION BLOCK SYSTEM

[75] Inventors: M. Samuel Moore, Northridge; Charles F. Paluka, Canoga Park, both of Calif.

[73] Assignee: Semco Instruments, Inc., No. Hollywood, Calif.

[21] Appl. No.: 729,544

[22] Filed: May 2, 1985

[51] Int. Cl.⁴ .......................... G01K 1/08; G01K 1/14
[52] U.S. Cl. ........................... 374/144; 374/179; 374/208; 340/870.17; 324/110; 338/226; 136/235
[58] Field of Search ............... 374/115, 110, 113, 137, 374/144, 141, 210, 168, 179, 208; 340/870.17, 292; 307/200 A, 442, 443; 324/110; 338/226; 136/235

[56] References Cited

U.S. PATENT DOCUMENTS

| | | | |
|---|---|---|---|
| 2,888,508 | 5/1959 | Rademacher | 374/179 |
| 2,926,209 | 2/1960 | Cantlin et al. | 136/235 |
| 3,022,362 | 2/1962 | O'Brien | 136/235 |
| 3,053,091 | 9/1962 | Braunagel | 374/179 |
| 3,451,268 | 6/1969 | Meador | 374/144 |
| 3,584,510 | 6/1971 | Harris | 374/179 |
| 3,617,886 | 11/1971 | Werme | 324/110 |
| 4,186,605 | 2/1980 | Bourigault | 374/115 |
| 4,440,508 | 4/1984 | Haloburdo, Jr. et al. | 374/179 |

*Primary Examiner*—Charles Frankfort
*Assistant Examiner*—Thomas B. Will
*Attorney, Agent, or Firm*—Poms, Smith, Lande & Rose

[57] ABSTRACT

An aircraft engine which may, for example, be a turbine engine, is provided with an engine temperature thermocouple harness for monitoring the temperature of the aircraft engine. A protective isolation assembly allows for the use of two separate aircraft circuits coupled to receive temperature indicating signals from the thermocouple system. The protective assembly includes two resistors sealed in a metal housing to be connected at the branch point from the existing aircraft temperature monitoring system; and the housing for the protective assembly is electrically and mechanically connected in direct proximity to the thermocouple harness output terminal housing. A short circuit of the second engine temperature monitor circuit would have negligible effect on the existing temperature indicator circuitry in view of the presence of the isolation block assembly.

13 Claims, 7 Drawing Figures

4,573,806

THERMOCOUPLE ISOLATION BLOCK SYSTEM

FIELD OF THE INVENTION

This invention relates to engine temperature monitoring systems for aircraft engines.

BACKGROUND OF THE INVENTION

The accurate indication of operating temperature of an aircraft engine is essential for aircraft operation and maintenance. To monitor engine temperature, thermocouple wiring harness connector systems are commonly utilized for sensing operating temperatures at selected points along the aircraft engine. The thermocouples produce temperature indicating signals which are employed in existing aircraft monitoring and/or control systems. In addition to the existing aircraft monitoring and/or control systems, it may be desirable to provide additional temperature responsive circuitry, for engine power management and for the recordation of over-temperature conditions, for specific example. However, aircraft manufacturers may in some cases be reluctant to connect new systems to an existing thermocouple harness, through concern that, perchance, the new system might short circuit out the thermocouple output signals and thus interfere with the existing aircraft systems.

It is, therefore, a principal object of the present invention to provide a protective isolation assembly which allows for the use of a second aircraft temperature responsive system, which, if it should develop a short circuit, would not affect, or minimally affect the temperature signals as received by the initial and vital aircraft temperature responsive system.

SUMMARY OF THE INVENTION

In accordance with the present invention, a temperature monitoring system for aircraft engines includes two aircraft circuits for receiving temperature signals from a single thermocouple source, and a protective isolation terminal block assembly is provided. This isolation terminal block includes a metal housing to implement the circuit branching point, and this metal housing has extending therefrom a pair of input terminals which may be in the form of buses spaced to be firmly secured to output terminals between the thermocouple harness and the existing aircraft system. Within the isolator terminal block assembly are a pair of resistors carefully protected by insulating material and extending to a pair of output terminals to which the second temperature responsive circuit may be connected.

In accordance with one aspect of the invention, the isolation terminal block housing may be configured to match the shape of the body of the thermocouple terminal housing in such a manner that the surfaces are immediately adjacent to one another, with the terminal openings in the buses to the isolation housing overlying the threaded output connections from the thermocouple terminal housing. With this configuration, and using a pair of isolation resistors embedded in the isolation assembly, a high level of confidence is provided, that any short circuit or other potential problem in the additional circuitry, will not adversely affect the basic aircraft circuits to any significant extent. Thus, even directly short circuiting the output terminals of the isolation block assembly will only shift the temperature reading of the original aircraft system by one-third of a degree, centigrade.

Other objects, features and advantages of the invention will become apparent from a consideration of the following detailed description and from the accompanying drawings.

DETAILED DESCRIPTION

Figure 1:
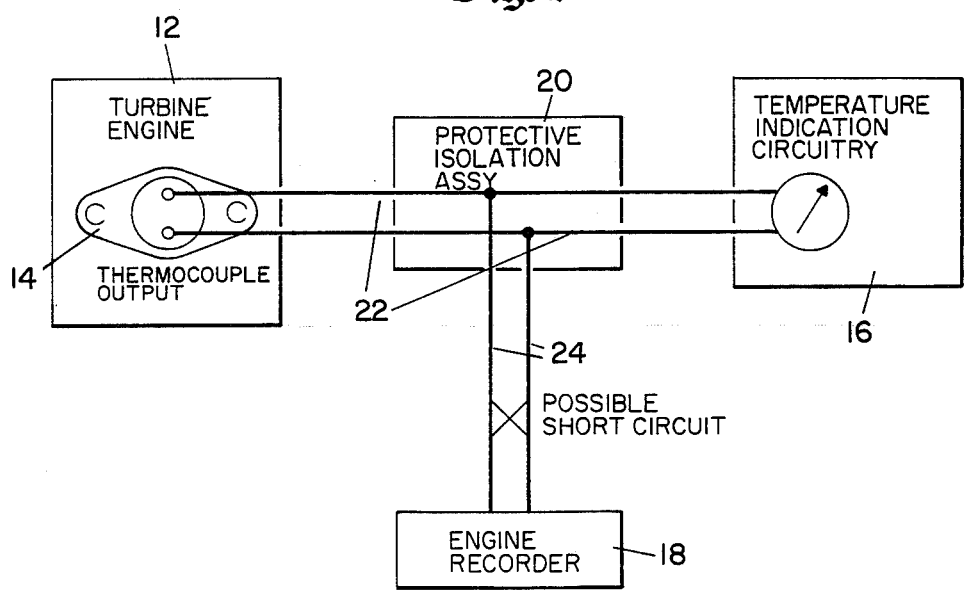
FIG. 1 is a block diagram of an engine temperature sensing system using an isolation terminal block assembly illustrating the principles of the present invention.
Figure 2:
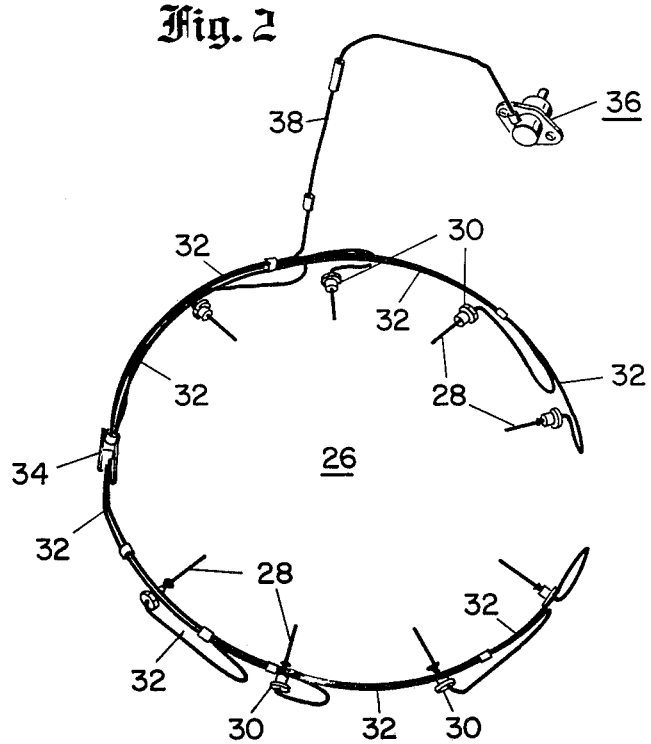
FIG. 2 is an end view of a terminal block attached to a set of thermocouples completing a thermocouple wiring harness.

Referring more particularly to the drawings, FIG. 1 is a schematic showing of an aircraft turbine engine 12 and a thermocouple output terminal housing 14 which provides an electrical signal related in value to the operating temperature of the aircraft engine, as sensed by a thermocouple wiring harness and connector system 26 (best shown in FIG. 2). The engine recorder 18 is interconnected between the thermocouple terminal housing 14 and the temperature responsive circuity 16 through a protective isolation assembly 20, by wiring 22 and 24.

The thermocouple wiring harness and connector assembly 26 is shown in FIG. 2. The wiring harness 26 includes a plurality of thermocouple probes 28 connected by respective connectors 30 to cables 32 which are each, in turn, connected to a central junction box 34. A harness terminal housing 36 (best shown in FIGS. 3 and 4) is attached to the wiring harness system 26 by means of electrical leads 38.

Figure 3:
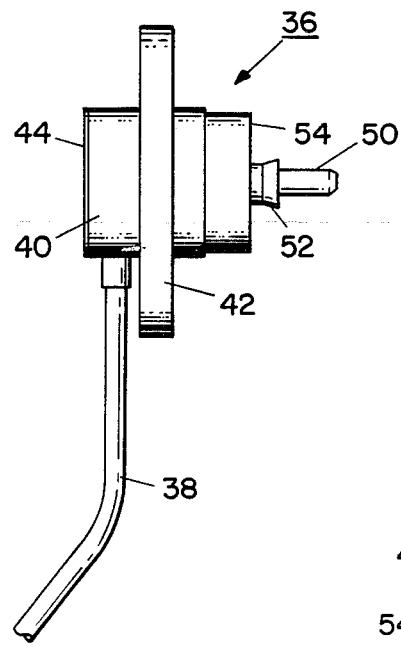
FIG. 3 is a side-view of the thermocouple housing attached to the harness of FIG. 2.
Figure 4:
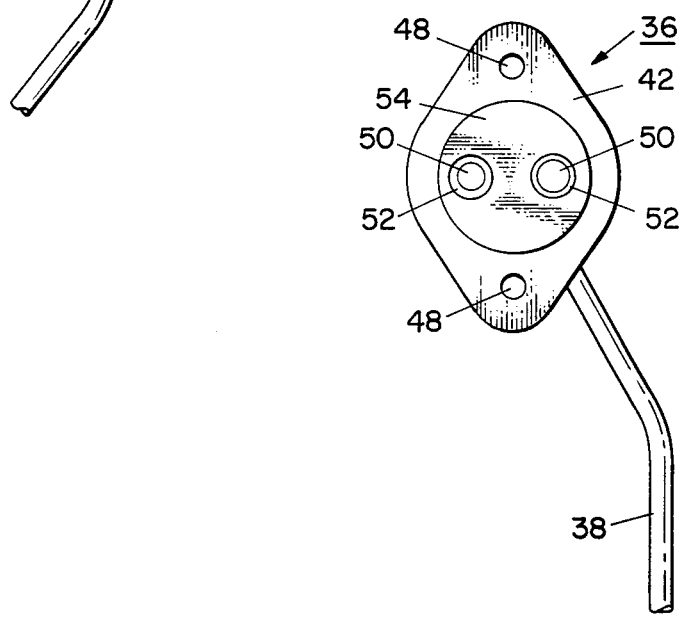
FIG. 4 is a top view of the terminal housing of FIG. 3.

FIG. 3 is a side view of harness terminal housing 36 and the electrical conduit 38. The input lead conduit 38 attaches to terminal housing 36 at the terminal housing base 40. Housing base 40 has a moisture seal 44 for additional insulation and protection from engine heat. Housing terminal flange 42 allows terminal 36 to be mounted on an available engine flange or adjacent surface by the mounting holes 48, as shown in FIG. 4. Harness terminal housing 36 has a pair of output terminals 50 securely mounted on the raised portion 54 of the housing. Output terminals 50 are surrounded by a high temperature insulation material within an output terminal encasing 52.

Figure 5:
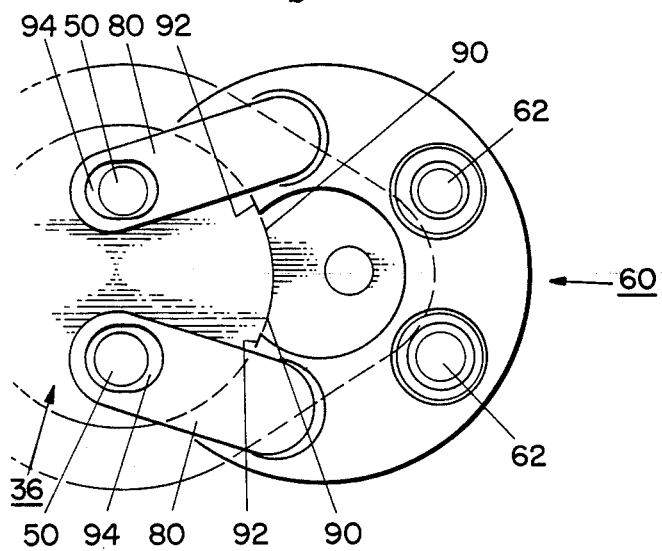
FIG. 5 is a top view of an isolation terminal block assembly associated with a thermocouple terminal housing.

FIG. 4 shows a top view of the terminal housing 36. The configuration of mounting flange 42 affords not only easy mounting by the use of holes 48, but also a surface which will abut the body of an isolation assembly, as best shown in FIG. 5, in such a manner so that the flange 42 is immediately overlapped by the isolation assembly housing. As described below, the shoulder of the raised portion 54 of the terminal housing 36 surface abuts the body of the isolation terminal block assembly 60.

Figure 6:
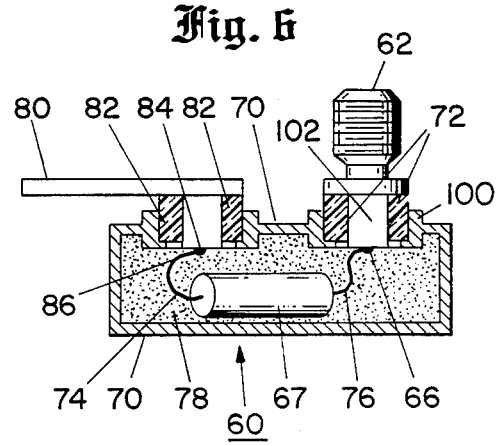
FIG. 6 is a side cross-sectional view of the isolation terminal block assembly of FIG. 5.

FIG. 6 is a side cross-sectional view of the isolation terminal block assembly 60. A pair of output terminals 62 are each attached to a separate resistor 67 by a spot-weld 66 or other method of attachment at the base 102 of the output terminal 62. The output terminals 62 are securely mounted on the isolator assembly housing 70. High temperature insulation sleeves 72, made for example of ceramic material, space terminals 62 from housing 70. The pair of resistors 67 are surrounded by a high temperature insulating material 78, for example potting cement, to provide requisite insulation to insure efficient performance as well as spacing from housing 70. Leads 74 and 76 provide electrical connections between resistors 67 and output terminals 62 and input buses 80.

FIG. 5 is a top view of the isolation block assembly 60 in electrical and physical contact and engagement with the thermocouple terminal housing 36 of FIG. 3, as shown. Buses 80 extend to engage with output terminals 50 of thermocouple housing 36 by being placed over terminals 50 which then protrude through holes 94 on buses 80. Incidentally, the design of buses 80 is such that the connection formed with output terminals 50 forms mechanical and electrical connections. Housing 60 has curved surfaces 92 facing the thermocouple housing 54 so that the surfaces abut, or are immediately adjacent one another.

As discussed, the shapes of the output thermocouple housing and the isolation block assembly enhance the utility of the invention. The housings interconnect and overlap in forming the connections so as to require a smaller area for mounting and attachment. Additionally, providing for screw holes 48 on mounting flange 42 further provides mechanical stability, as the lower surface of the isolation housing 70 rests on mounting flange 42. It should be noted that as illustrated here, the isolation assembly 60 is a C-shaped. However, concerning configuration, isolation assembly 60 can be modified so as to still provide firm mechanical and electrical coupling with alternate thermocouple housing configuration, by designing the isolation block assembly to conform to the new shape.

Figure 7:
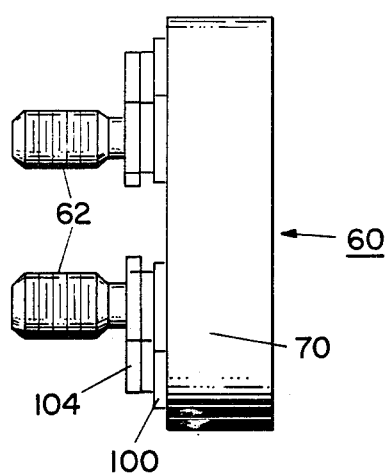
FIG. 7 is an end view of the isolation block assembly of FIGS. 5 and 6.

FIG. 7 is an end view of isolation assembly 60, or a view from the right hand side of FIG. 5. In FIG. 7 output terminals 62 are mounted on isolation housing body 70. Housing body lip 100 extends partially above the housing body 70 in order to better support and protect the insulating cylinder 72 surrounding output terminal base 102. Output terminal flange 104, overlies the insulating sleeve 72 and further protects output terminal 62.

For completeness a few additional matters may be noted. Thermocouples are made of two dissimilar metals, such as chromel and alumel, and these two metals are carried from the high temperature zone through the housing 36 and 60 to the circuitry 16 and 18, as indicated in the circuit of FIG. 1. In the circuits 16 and 18, cold junction temperature compensation is provided, in a manner known per se. Accordingly, referring to FIG. 5 for example, one of the terminals 50 may be of one thermocouple material, such as chromel, and the other may be of the other thermocouple material, such as alumel, and these metals are carried over into the buses 80 and the output terminals 62. The resistors 67, which may for example be 1,000 OHM resisters, and their leads, are not of the special thermocouple materials, but with all resistor-to-terminal connections 66, 86 etc. being at substantially the same temperature, this causes no problem, and does not affect the temperature signals. Other thermocouple materials may also be used.

In the foregoing description of the present invention, a preferred embodiment of the invention has been disclosed. It is to be understood that other mechanical and design variations are within the scope of the present invention. Thus, by way of example and not of limitation, different types of insulation and thermocouple materials, and input and output terminal arrangements may be employed. In addition, instead of 1,000 ohm resistors, the isolation assembly may include resistance from a few hundred ohms to many thousands of ohms. Accordingly, the invention is not limited to the particular arrangement which has been illustrated and described in detail hereinabove.

What is claimed is:

1. An engine temperature monitoring system for aircraft engines, comprising:
   at least one aircraft engine;
   thermocouple means for sensing the operating temperature at one or more selected points of said aircraft engine and producing temperature varying signals at a first pair of terminals;
   a first aircraft circuit coupled to receive signals from said thermocouple means at said terminals;
   a thermocouple output isolation assembly means connected to said pair of terminals for receiving and transmitting thermocouple signals from said pair of terminals;
   a second aircraft circuit requiring temperature signals coupled to said isolation assembly; and
   said isolation assembly including a pair of input buses for securing to said first pairs of terminals, a housing, a pair of output terminals securely mounted on said housing, a pair of resistors mounted within said housing and connecting said input buses to said output terminals, and high temperature insulation material surrounding said resistors and spacing said output terminals from said housing;
   whereby any possible short circuit in the connections from said isolation assembly output terminals to said second aircraft circuit would have minimal effect on the temperature signals received by said first aircraft circuit.

2. An engine temperature monitoring system as defined in claim 1 wherein an output thermocouple housing is provided for mounting said first pair of terminals, and wherein said isolation assembly has a housing surface complementary in configuration to, and abutting the body of said thermocouple housing in such a manner that the surfaces in question are immediately adjacent one another.

3. An engine temperature monitoring system as defined in claim 1 wherein said input buses of said isolation assembly are insulated by a ceramic insulating material.

4. An engine temperature monitoring system as defined in claim 1 wherein said isolation assembly means is of C-shaped configuration.

5. An engine temperature monitoring system as defined in claim 1 wherein said input buses extend to form both mechanical and electrical connections with said first pair of terminals when said housings are adjacent one another.

6. An engine temperature monitoring system as defined in claim 1 wherein the terminals in each pair are of different thermocouple materials, and said buses are also of corresponding different thermocouple materials.

7. An engine temperature monitoring system as defined in claim 1 wherein said resistors have a resistance in the order of a few hundred ohms to many thousands of ohms.

8. A protective isolation assembly for use in an engine temperature monitoring system, comprising:
- a pair of insulated input buses of different thermocouple materials;
- a housing on which a pair of output terminals are mounted;
- a pair of resistors mounted in said housing for connecting said input buses to said output terminals;
- a high temperature insulation means for insulating said pair of output terminals from said housing; and
- a high temperature insulating material for insulating said pair of resistors.

9. The protective isolation assembly as defined in claim 8 wherein said input buses extend outward beyond said housing and having openings at the ends thereof to form mechanical and electrical connections to an adjacent thermocouple terminal housing assembly.

10. The protective isolation assembly as defined in claim 8 wherein said resistors are surrounded by a high temperature insulating material.

11. the protective isolated assembly as defined in claim 8 wherein said assembly is of C-shaped configuration.

12. An engine temperature monitoring system for aircraft engines, comprising:
- thermocouple means for sensing the operating temperature at one or more selected points of an aircraft engine and producing temperature varying signals at a first pair of terminals;
- first circuit means coupled to receive signals from said thermocouple means at said terminals;
- thermocouple output isolation assembly means connected to said first pair of terminals for receiving and transmitting thermocouple signals from said pair of terminals;
- a second circuit means requiring temperature signals coupled to said isolation assembly;
- said isolation assembly including a pair of input buses for securing to said first pairs of terminals, a housing, a pair of output terminals securely mounted on said housing, a pair of resistors mounted within said housing and connecting said input buses to said output terminals, and high temperature insulation material surrounding said resistors and spacing said output terminals from said housing;
- output thermocouple housing means for mounting said first pair of terminals;
- said isolation assembly having a housing surface complementary in configuration to, and abutting the body of said thermocouple housing in such a manner that the surfaces in question are immediately adjacent one another;
- said input buses extending to form both mechanical and electrical connections with said first pair of terminals when said housings are adjacent one another; and
- the terminals in each pair being of different thermocouple materials, and said buses also being of corresponding different thermocouple materials;
- whereby any possible short circuit in the connections from said isolation assembly output terminals to said second circuit means or in said second circuit means has minimal effect on the temperature signals received by said first circuit means.

13. An engine temperature monitoring system as defined in claim 12 wherein said isolation assembly means is of C-shaped configuration.

* * * * *